MEASURING PROCESS FOR THE RECORDING OF THE INTENSITY OF SIGNAL SEQUENCES

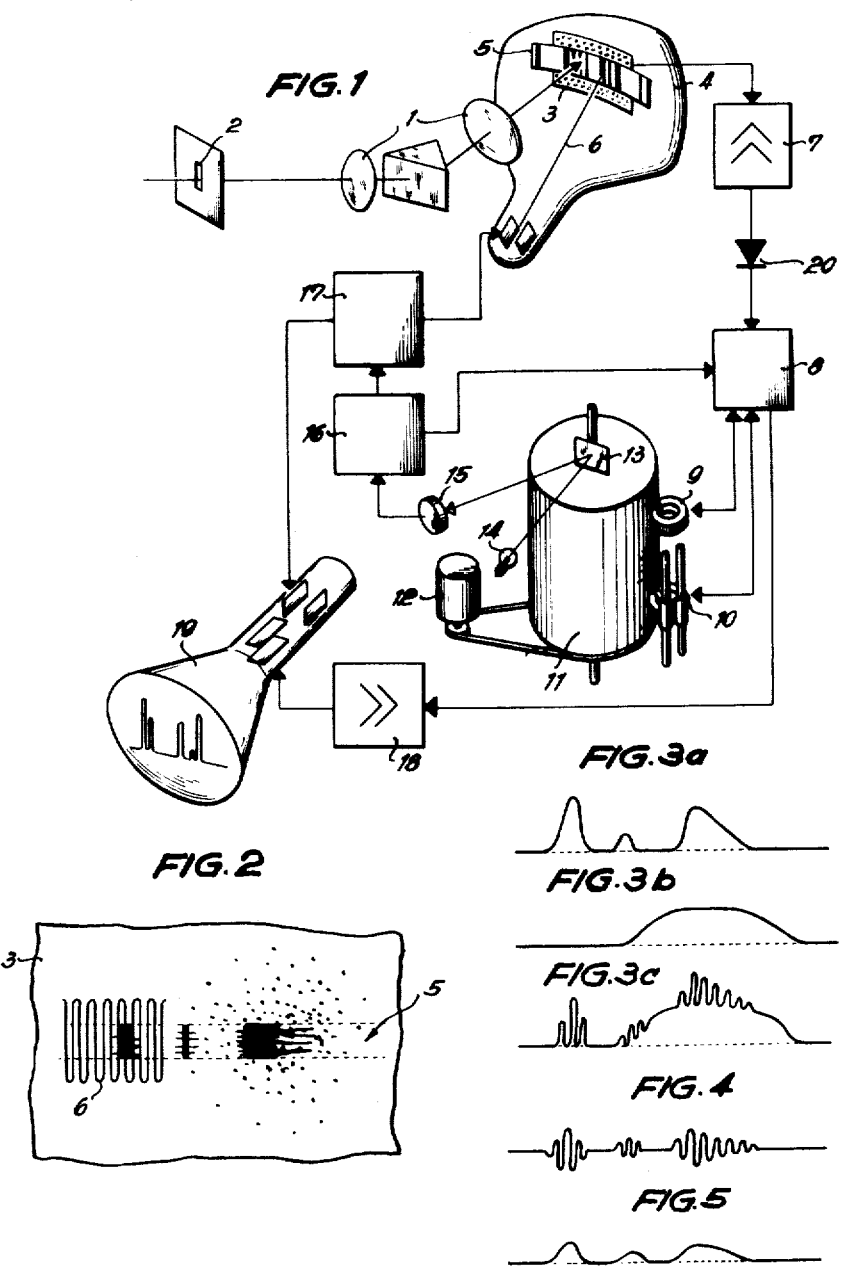
*INVENTOR,*
NIELS HEIMO NIELSEN 2,871,465

Niels Heimo Nielsen, Hamburg, Germany

Application October 13, 1954, Serial No. 462,072

Claims priority, application Germany October 20, 1953

2 Claims. (Cl. 88—14)

This invention relates to a process and apparatus for recording the intensity, by electro-oscillographic means, of signal sequences which are capable of being scanned periodically but which vary greatly as to absolute intensity and relative intensity. Up to now for the spectral emission analysis, the following three methods are usually employed:

(1) The spectrum is slowly scanned by means of a photo receiver being moved relatively to said spectrum, and the registration of the result is recorded as a curve. For compensating the short-periodical variations in intensity the movement must be very slow and the registrating means have to work correspondingly slower. Therefore, the composition to be analysed changes during the exposure and the records are falsified.

When photographically recording the spectra it is usual to work with exposure times of 1–2 minutes, wherein during the first 15–20 seconds of the fractional evaporation of the highly volatile elements the spectral lines of these appear nearly exceptionally. The lines of the less volatile elements contrarily reach their maximum intensity not earlier than in the second half of the exposure time.

(2) The spectrum is quickly scanned and the measured values are transmitted to storage "channels" which are switched on synchronously with the scanning. With this each spectral line is integrated over the total exposure time, for each channel, but it is integrated only during the short scanning time. Quick variations in intensity—so far as they are not absolutely periodical so that they become obvious in the course of the registration—may easily lead to false results. Besides, this the method is only suitable for such analyses in which the elements to be analyzed may be determined in advance, since the contacts must have been set when the measurement begins. The number of the elements to be analyzed depends on the capacity of the given storage means; so that under certain circumstances the coincidence of lines is not recognized in the analysis so that the result is falsified.

(3) For each spectral line there is provided a separate receiver and a separate storage means. According to this measuring principle the variations in intensity are omitted as sources for errors. However, also in this case serious trouble may arise in regard to coincidence of lines, since it is very difficult to make out probably coinciding elements, because of the crowded arrangement of all the receivers within the projecting plane of the spectrograph.

It is now becoming possible to employ the receivers for dissolving and storing in two dimensions—the image storage tubes or iconoscopes, especially the Image-Orthicon. For the absorption analysis such an arrangement has already been described (U. S. 2,324,270). This only serves for increasing the sensibility of the storage principle and makes use of the constructive advantages of the electric scanning (increasing the scanning frequency to $10^{-3}$ sec. for the temporal dissolution of outmost quick operations), whilst for all these methods the possibility for finding out the mean value when the signal intensities are inconstant and vary is without interest. In order to obtain a complete compensation of the intensity displacements in the spectral emission analysis the storage duration of the tube should be at least 1–2 minutes (that means in regard to known use thousand times as long). In respect to technical design there should be no difficulties in providing a storing layer in which the charge leakages during the whole exposure time may certainly be held below fractions of 1%; this difficulty may be avoided since the charge image during the exposure is already removed and transmitted to a second storage means.

The main object of the present invention is the combination of a first storage means, which continuously sums-up the frequency spectrum to be analyzed (as e. g. the mosaic cathode of the image storing tube), with a second storage means of the same storing ability. Essentially it is the task of the first storage means to detect exactly simultaneous signals, whilst the second storage means has to store by the first storage means periodically scanned spectrum free from leakage for any desired time and further to add the energy transmitted with each scanning cycle to the already stored energy. At the end of the whole measurement there is within the second storage means an image of the whole energy received by the first storage means during the exposure time, and this image can be transmitted to the recording beam of an oscilloscope and so become visible. For the secondary storing there is used a method which makes possible a desired frequent scanning—e. g. the amplitude-modulated or frequency-modulated recording on a magnetic storing layer similar to the known magnetic sound recording tapes—so the second storage means may as well be used for the permanent storing of comparison spectra.

Fundamental changes are now occurring in many branches of the measuring art as a result of the progress made by electrical measuring and recording methods. For example, the fact that conventional photometric accessories such as the photographic plate or the human eye are being replaced by the photoelectric cell and by the developments thereof known as the electron multiplier and the iconoscope not only results in an increase in the accuracy of measurements but also the time saved when using the new direct-reading measuring devices usually compensates very rapidly for the higher initial outlay on the equipment.

Spectral emission analysis has so far been an exception to the foregoing. In this operation, since the intensity of emission cannot be maintained as constant as in other photometric measuring problems, the requirements as to measuring accuracy are also somewhat lower but can no longer be satisfactorily fulfilled with the photographic plate in present-day spectrographs, more particularly in the relatively modern arc arrangements (high-frequency and "Pfeilsticker" arcs). In addition to the large unavoidable error in evaluation (even when spectral photometers are used), the applicability of the method is adversely affected by the labour and time required from recording until the measurement of intensity has been evaluated, yet only in very few cases has direct electrical recording been successful heretofore, usually because known types of receiver are not adapted to bridge the considerable simultaneous variations in intensity of all the analysis lines in the rhythm of the "Pfeilsticker" frequency or, with a simple arc, during unsteady burning and in addition to balance out the relatively slow displacement of the intensity relationship, which displacement occurs throughout the irradiation as a result of the varying evaporation rates of the individual elements and compounds and which limits the duration of irradiation, independently of the light intensity of the spectrograph, to at least ½ to 1 minute.

In this special case and in a number of similar measuring problems, the receiver must be so designed as to indicate not the output (for example, the radiated power or the photoelectric current) but the total energy absorbed per signal (that is to say, the total quantity radiated in to the signal image, corresponding to the photochemical decomposition produced per surface element in photographic recording). A receiver suitable for this purpose (in addition to the photosensitive plate) is the iconoscope such as is used in television cameras in which, however, storage serves a completely different purpose, being merely intended to increase sensitivity and having now been abandoned in a number of modern types of tube in favour of direct subsequent amplification through an electron multiplier. Moreover, the storage capacity of the iconoscope is generally insufficient for recording emission spectra, since in order to balance out the relatively slow variation of the intensity it is desirable for the irradiation to be as long as possible (one or more minutes).

Moreover, if in the intermittent-arc process according to Pfeilsticker and others each individual spark is regarded as an individual "measurement phase" with relatively great variations in intensity, it is also clear that the mean (statistical) error of the overall result depends upon the number of sparks or upon the duration of the illumination.

This specification discloses a process which, in the case referred to and in similar cases, enables the intensity to be recorded electrically, the idea underlying the invention residing in the combination of a short-term and a permanent storage. Short-term storage is effected in a manner suitable for solving the measurement problem and merely has the task of converting a system of individual signals, such as a spectrum, which are radiated or transmitted in any other way simultaneously to the measuring device, into a signal sequence recurring periodically for each scan, while the permanent storage means always records each individual signal, for instance of the spectrum, at the same point, sums the individual intensities and this makes it possible upon termination of the measurement, to scan the entire intensity distribution and to display the same as a vertical oscillograph record.

The invention also relates to a device for measuring emission spectra, in which the co-operation or the novel construction of elements known per se (iconoscope or light-sensitive receiver of similar effect, and magnetic recording and reproducing means or similarly operating electrical storage means) is adapted to the aforementioned process.

The invention will be described more particularly with reference being had to the drawing, in which:

Fig. 1 shows an embodiment of the measuring device of the invention.

Fig. 2 shows a portion of the mosaic screen of the iconoscope of Fig. 1, and

Figs. 3a, 3b, 3c, 4 and 5 are diagrams serving to explain the operation of the invention.

A spectrum 5 is projected on to the mosaic 3 of the iconoscope 4 by optical means 1 for splitting up the measured light passed through the slit 2 into its spectral components. An intensity-modulated photoelectric current, which is amplified in the amplifier 7, is produced when the mosaic 3 is scanned by electron beam 6. An electronic switch 8 serves to feed the signal to any one of the two recording and reproducing heads 9 or 10 forming part of a magnetic storage device which comprises, furthermore, a magnetic drum 11, a constant-speed driving motor 12, and, for each of the heads 9 and 10, an erasing device (not shown) for de-magnetising the drum. The drum is also provided with means for synchronising the scanning operation in the iconoscope 4 and for controlling the operation of the electronic switch 8, which means are shown in Figure 1 as a mirror 13, which allows light to pass from the light source 14 to the photoelectric cell 15 once during each revolution of the drum. This causes the associated amplifier 15 to deliver at a predetermined position of the drum a control pulse to the time base oscillator 17 for the scanning beam 6 and to the electronic switch 8. This ensures that the signal for each individual point of the mosaic 3, that is to say each line of the spectrum 5, is always recorded at the same point, so that the intensity of the magnetisation is in the desired manner added right up to the end of the measurement. When the measurement is completed the electronic switch 8 is changed over for scanning of the record and (after further amplification in the amplifier 18) reproduction thereof vertically on an oscillograph 19, horizontal deflection being produced by the time base oscillator 17 in synchronism with the scanning process.

Normally only one of the two magnetic heads 9 or 10 is used for recording during a measurement. The other head for example the head 10, can be displaced parallel with the drum axis so that it can serve to store a large number of magnetic records for comparison. Thus, if the electronic switch 8 alternates between the head 9 and the head 10 while reproduction is being effected on the oscillograph, the oscillograph screen will display the measured curve and the comparison curve on top of one another, an auxiliary circuit arrangement (not shown) being adapted to control the beam intensity in response to the electronic switch so as to enable the two curves to be distinguished from one another.

In order that the curve displaced on the oscillograph screen may provide a true reproduction of the spectral intensity, two sources of error must be eliminated: first, the superposition of scattered light of different wave length and, second, the charging of small areas of the mosaic through incomplete removal of the electrons. To this end, at the same time as the spectrum 5 is scanned by the electron beam 6, that part of the mosaic 3 lying immediately above and below the spectrum 5 is also scanned by the beam 6, which to this end describes a high-frequency sine curve (shown in principle on the left of Figure 2; the references correspond to the foregoing). The A. C. voltage for this purpose is supplied from an H. F. oscillator (not shown).

The distribution of intensity along this scanning path is composed of that of the spectral lines (Figure 3a, see also Figure 2) and that of the error signal (Figure 3b) in the manner illustrated in Figure 3c the vertical steps of this curve corresponding to the intensity steps between the spectrum and the regions above and below (see Fig. 2). If the transverse extent of the spectrum (length of the spectral lines) is small as compared with the extent of the error signal and therefore its intensity inside and outside the spectrum the same within the obtainable accuracy of the measurement, the high frequency modulation amplitude of the photoelectric voltage (Fig. 3c) represents the intensity of the spectral lines in a manner similar to the well known "Amplitude-Modulation" of telecommunication and telemetering techniques. The frequency of transverse scanning must be as high as to allow proper representation of the narrowest spectral lines to be expected but need not be in a simple relationship to the other frequencies used and therefore need not be synchronized. Out of these mixed signals the intensity distribution of the spectrum is gained by well known techniques, i. e., the error signal is suppressed by H. F. amplification (Fig. 4) and the envelope curve is gained by means of an H. F. detector (20 in Fig. 1) and low frequency amplification. Fig. 5 shows this (similar to Fig. 3a) without amplification.

What I claim is:

1. A method for recording the intensity of signal sequences with greatly variable absolute and relative intensity of electro-oscilloscopic means including the following steps, receiving and storing directly the signal sequence in a first storage means, scanning periodically said first storage means to transmit all signal elements of the initially recorded signal sequence from said first storage means to a second storage means, in each scanning cycle separately summing all transmitted signal elements to the corresponding signal elements already stored in said second storage means so that upon termination of the scanning process said second storage means contains an image representing the total intensity distribution of each signal element which can be made visible and evaluated by scanning of said second storage means, storing the intensity distributions for comparison and rendering at least one signal sequence visible as a comparison curve simultaneously with the curve of an investigated distribution, said comparison signal sequence being stored on said second storage means.

2. A method for recording the intensity of a signal sequence representing the average intensities of a multiplicity of simultaneous, spatially separated continuous signals varying in absolute and relative intensity by electro-oscilloscopic means including the following steps, continuously receiving and storing directly the signals on a sensitive receiving surface of a first storage means adapted to store signals for a first period, periodically scanning said first storage means by a first scanning means adapted to scan said receiving surface at least once during said first period and transmit all signal elements of the initially recorded and stored signal sequence from said first storage means to a second storage means adapted to store signals for a second period, the duration of said second period being greater than said first period, in each scanning cycle separately adding the transmitted signal elements to the corresponding signal elements already stored in said second storage means whereby upon termination of the repeated scanning of the first storage means said second storage means contains an image representing the average intensity of each signal element which can be made visible and scanning said second storage means by a second scanning means adapted to scan said second storage means several times and at least once during said second period to evaluate the average intensity of each of said signals.

References Cited in the file of this patent

UNITED STATES PATENTS

| | | |
|---|---|---|
| 2,240,722 | Snow | May 6, 1941 |
| 2,324,270 | Schlesman | July 13, 1943 |
| 2,597,001 | Jaffe | May 20, 1952 |
| 2,617,705 | Coombs et al. | Nov. 11, 1952 |